Patented Sept. 18, 1951

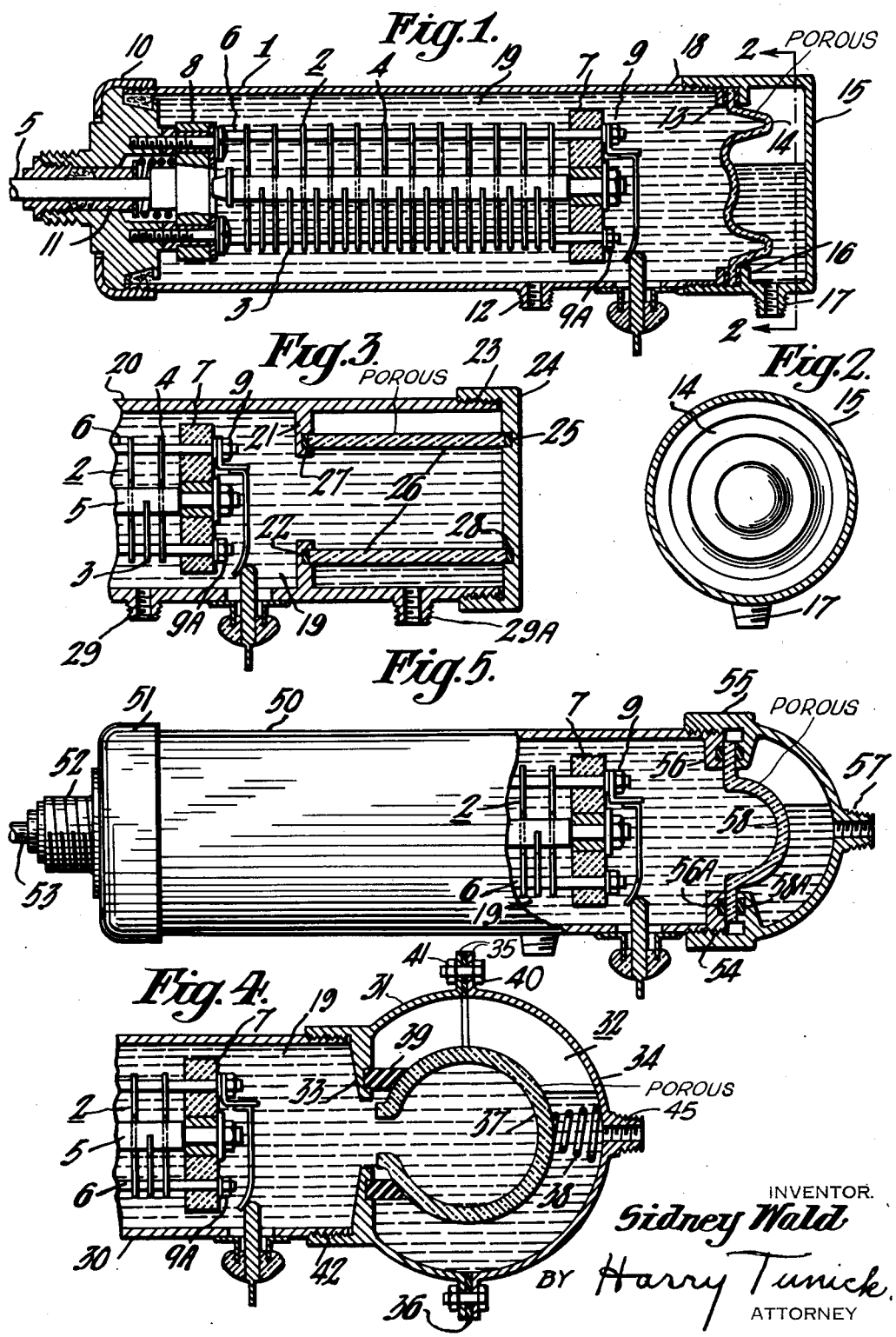

2,568,422

UNITED STATES PATENT OFFICE 2,568,422

FLUID EXPANSION DEVICE FOR ELECTRICAL APPARATUS

Sidney Wald, Philadelphia, Pa., assignor to Radio Corporation of America, a corporation of Delaware Application July 21, 1947, Serial No. 762,303

4 Claims. (Cl. 174—12)

1

This invention relates to a new and improved expansion device for liquid filled electrical devices such as, for example, capacitors.

The purpose of this invention is to eliminate the need for an expensive expansion device (such as a thin metallic spring loaded bellows) for taking up variations in the volume of a completely liquid filled chamber.

The fluid expansion device of this invention is adapted for high altitude aircraft and marine radio equipment.

In a completely liquid filled electrical device, such as, for example, a variable liquid dielectric tuning capacitor as is disclosed in my copending application Serial No. 559,621, filed October 20, 1944, now abandoned, it is of prime importance with such a construction that no gaseous voids exist in the capacitor casing. As is disclosed in the above mentioned application, an ordinary metallic bellows takes care of volume changes due to variations of liquid temperature. In place of the metallic bellows, the present invention utilizes a microporous porcelain separator to form a partition between the completely filled liquid chamber and an expansion compartment which is only partly filled. The volume of the liquid within the expansion chamber is determined by the range of temperature variations to which the condenser is to be subjected in actual operation.

This invention will best be understood by referring to the accompanying drawing in which:

Fig. 1 is a longitudinal section of an electrical device having attached thereto the porous filter expansion device of this invention;

Fig. 2 is a cross-section taken on lines 2—2 of Fig. 1;

Fig. 3 is a longitudinal section of another modification of the invention wherein a cylindrical porous filter expansion element is employed;

Fig. 4 is a longitudinal section of a further modification of this invention wherein the porous filter expansion device is in the form of a spherical element; and Fig. 5 is a longitudinal section of a modification of Fig. 4 employing a hemispherical porous filter expansion element.

Referring now in detail to the drawings, a metallic tubular casing 1 has located therein a variable tuning capacitor 2 or any other device. The capacitor device 2 has spaced semicircular rotor plates 3 and semicircular stator plates 4. The rotor plates 3 are operated by a shaft 5. The stator plates are supported by a plurality of support rods 6 which are secured to the insulating end plates 7 and 8 by any suitable means, such as rods 9 and nuts 9A. The end of the casing is closed by a cover member 10 having a suitable gland packing bushing 11 through which a rotary shaft turns for varying the electrical capacity of the capacitor. The capacitor portion of casing 1

2 is provided with a threaded filling tube 12. The rear of casing 1 is provided with an inwardly extending flange 13. The flanged end of casing 1 is closed by means of a microporous porcelain filter element 14 which rests against flange 13. The filter disc 14 has a contour such that no matter in what position the casing 1 is held there will always be liquid in contact with both sides. The preferred contour has a plurality of ridges concentrically arranged, the ridges being of different levels. The porcelain filter is retained at the end of casing 1 by means of a metallic end cover 15 which has located therein an inwardly extending flange 16. The lower end portion of cover 15 is provided with a filling tube 17. End cover 15 is secured to casing 1 by any suitable means such as, for example, soldering around the outer rim at a point 18, or the two members 1 and 15 may be brazed together in any suitable manner.

After the capacitor is assembled, the casing 1 is completely filled with a liquid dielectric 19, which is preferably of petroleum naphtha prepared by a filter process as described in my copending application Serial No. 563,430, filed November 14, 1944, which ripened on August 7, 1951, into Patent 2,562,972.

In the operation of this device the porous porcelain filter member 14 is always wetted by the liquid condenser dielectric 19, and due to capillary attraction and interfacial surface tension the porcelain filter will not permit the passage of a gas (such as air or dry nitrogen) so long as any portion of the porous filter material is in contact with the liquid. If the temperature surrounding the casing is varied, the liquid dielectric passes freely in either direction through the porous membrane while at the same time preventing the entrance of any fluid, air or gas, as bubbles, into the liquid filled compartment 1. As mentioned above, the filter disc contour is such that no matter in what position the casing is held there will always be liquid in contact with both sides of such disc. As shown by Fig. 1 of the drawing, the wetting of both sides of the filter member by the liquid is always maintained by having the minimum amount of liquid in the expansion compartment at the lowest temperature fill more than one-half the actual volume. The highest ridge in the filter member is also made more than one-half of the maximum depth dimension of the air space. With this arrangement, it will be seen that even if the device were to be placed in a vertical position there would still be a large amount of liquid in contact with both sides of the disc 14. Because it is desirable to have the maximum amount of liquid in contact with the filter member in order to wet the expansion compartment side of disc 14, the ridges on the filter member give an additional wetting surface.

Referring now to Fig. 3 of the drawing, the metallic casing 20 is somewhat similar to the casing 1 of Figs. 1 and 2, except that it has a central depending flange portion 21. The depending flange portion 21 is provided with a circular depressed channel portion 22. The far end of the casing is threaded at 23 to receive a movable cover portion 24. The cover 24 is provided with a circular channel 25 which is of the same inside and outside diameter as that of channel 22. An open ended cylindrical porous filter element 26 is positioned between member 21 and the end cover 24 and it is maintained in a concentric position by means of being located within channels 22 and 25. Fluid leakage is prevented by means of rubber gaskets 27 and 28. The device is filled through filling fixtures 29 and 29A with a fluid dielectric. The operation of this device is similar to that mentioned above in connection with Figs. 1 and 2, namely that capillary attraction prevents any gas from getting into casing 20 by passing through the porcelain filter element 26 so long as there is any of the liquid 19 in contact with both sides of the filter surface, sufficient to wet any portion of the surface.

Referring now in detail to the modification of Fig. 4 of the drawing, the expansion chamber portion in 32 is in two parts which are formed by hemispherical metallic members 31 and 34, both of which are clamped together by a flange portion 35. The metallic member 31 is provided with a depending flange portion 33. A gasket 36 is interposed between members 31 and 34 to prevent leakage of the fluid. Within the metallic expansion chamber portion there is located a spherical shaped porous filter element 37 which is clamped against the depending portion 33 by means of a clamp spring 38. Fluid leakage is prevented by gasket 39. Bolts 40 and nuts 41 are provided to clamp the two hemispherical end portions of the metallic casing together. The end of casing 30 is threaded at 42 to receive a threaded portion on member 31 which is also threaded. In order to secure the spherical element 37 in position on casing 30, heavy spring pressure is applied by spring 38, which pressure is sufficient to compress gasket 39. This spring provides a fluid tight seal between (in effect) casing 30 and the porous filter element 37. The casing is filled through fixtures such as 45 with a suitable fluid dielectric, This modification of this invention is somewhat more complicated because of its mechanical construction. However, it is an ideal shape because regardless of the altitude of the aircraft carrying the casing 30, some portion of the liquid will always be in contact with the spherical filter element 37. For this reason, the casing (particularly the expansion portion) can be of reduced dimensions, requiring a minimum amount of space.

The modification shown by Fig. 5 includes a cylindrical casing member 50 in which the immersed variable capacitor is located. The forward end of the casing 50 is provided with a threaded end cap 51 which has located in the center portion thereof a bushing 52 which serves as a packing gland for shaft 53 of the variable capacitor. The rear portion of casing 50 is threaded at 54 to receive an end cap 55. A depending flange portion 56 is located at the end of casing 50 and is provided with a channel 56A in which a resilient synthetic rubber gasket is provided. A porcelain hemisphere 58 is clamped between the depending portion 56 and the metallic end cap 55. A filling valve 57 is located in the center portion of the metallic end cap 55 and is provided with a suitable valve and fittings to fill the casing 50 with a liquid dielectric. This hemispherical porous filter arrangement is a more practical version than that shown by Fig. 4 and operates in the same general manner as that mentioned above. The porous porcelain dome 58 is held between two resilient gasket rings 56A and 58A which are compressed when the outer metallic cap 55 is screwed on to the end of casing 50 to provide a liquid tight seal between the two metallic casing portions.

While this invention is described in connection with electrical capacitors which are constructed to give low losses and have a high maximum capacity for high altitude aircraft radio equipment, it should be understood that the invention may be employed in other types of radio and high frequency apparatus.

What is claimed is:

1. An electrical capacitor, comprising a liquid-dielectric-filled container for enclosing the capacitor, a partially-gas-filled closed space forming an expansion chamber for the liquid in said container, and a spherical microporous porcelain member partitioning said container from said expansion chamber, one surface of said member forming substantially one continuous wall of said chamber, said member having a contour such that both of its sides will always be in contact with said liquid.

2. An electrical capacitor, comprising a liquid-dielectric-filled container for enclosing the capacitor, a partially-gas-filled closed space forming an expansion chamber for the liquid in said container, and a hemispherical microporous porcelain filter element partitioning said container from said expansion chamber, one surface of said element constituting one continuous wall of said chamber, said filter element having a contour such that both of its sides will always be in contact with said liquid.

3. A liquid expansion device for electrical apparatus, comprising a liquid-filled container for enclosing the electrical apparatus, a partially-gas-filled closed space forming an expansion chamber for the liquid in said container, and a microporous porcelain member partitioning said container from said expansion chamber, one surface of said member constituting one continuous wall of said chamber.

4. A liquid expansion device as defined in claim 3, wherein the porous member has a plurality of projecting ridges arranged to maintain both sides of the member in contact with the liquid regardless of the position of the container.

SIDNEY WALD.

REFERENCES CITED

The following references are of record in the file of this patent:

UNITED STATES PATENTS

| Number | Name | Date |
| --- | --- | --- |
| 1,790,718 | Palueff | Feb. 3, 1931 |

FOREIGN PATENTS

| Number | Country | Date |
| --- | --- | --- |
| 527,486 | Germany | June 18, 1931 |